Patented June 28, 1938

2,122,113

UNITED STATES PATENT OFFICE 2,122,113

PROCESS FOR PRODUCING STABLE SULPHURIC ACID ESTER SALTS OF LEUCO-VAT-DYESTUFFS IN DRY STATE

Roger Ratti, Basel, Switzerland, assignor to firm Durand & Huguenin S. A., Basel, Switzerland No Drawing. Application June 26, 1935, Serial No. 28,556. In Germany July 21, 1934

5 Claims. (Cl. 8—35)

It is known that the acid sulphuric acid esters of the leuco-vat-dyestuffs, like the acid sulphuric acid esters of phenols, are stable towards alkalies, but are decomposed by acids. They are brought onto the market in form of their alkali salts. In order to obtain them as stable preparations in powder form, it suffices in most cases to take care that there is present a certain amount of alkali in excess, for example sodium carbonate.

It has now been found, that some sulphuric acid esters of leuco-vat-dyestuffs, especially esters of leuco-vat-dyestuffs of the anthraquinone series, undergo, even in the presence of a great excess of alkali, a slow decomposition, whereas in the form of a paste they are stable for years. It is indeed possible to dry these paste preparations and to grind them. However, after a relatively short time, a slow progressive decomposition of the powdered preparations sets in and cannot be restrained by the alkali in excess, which is present and is intended to neutralize liberated acid in order to thus avoid acidification of the mass. It appears that the oxygen of the air plays a part in this slow decomposition.

According to the present invention, a way has been found, according to which the above mentioned sulphuric acid esters, for instance the potassium salt of the tetrasulphuric acid ester of the tetrahydro-dichloro-1:2-2':1'-dianthraquinone azine, which, in spite of the excess of the alkali present, are liable to decomposition, can be transformed into stable preparations in powder form. For this purpose the moist alkali salt of the ester is intimately mixed with an excess of alkali, with an aqueous solution of an agglutinant and with urea. The thus obtained paste is evaporated to dryness, preferably under reduced pressure. As agglutinants there may be cited glucose, cane-sugar molasses, sulphite cellulose waste liquor, dextrin, gum, glue and similar substances; also mixtures of any of these substances may of course be used.

The invention is illustrated by the following examples.

Example 1

300 kilos of the potassium salt of the acid sulphuric acid ester of leuco- Bz 2: Bz 2'-dimethoxydibenzanthrone in form of a paste containing 20 per cent of the vat-dyestuff in the form of the ester are mixed in a ball-mill with 6 kilos of caustic soda solution (33%), 15 kilos of commercial molasses syrup and 10 kilos of urea dissolved in 20 litres of water. As soon as the mass has become mixed to a homogeneous paste, the water is eliminated at about 60° C. in a vacuum dryer. There is obtained a dark-red powder which can easily be ground and dissolves easily in water to a red solution.

Example 2

100 kilos of the sodium salt of the acid sulphuric acid ester of the leuco-compound of the green vat-dyestuff described in Example 1 of the German specification No. 212,471, in the form of a paste, containing 15 per cent of the vat-dyestuff in the form of the ester, are mixed in a ball-mill with 1 kilo of caustic soda solution (30%), 7.5 kilos of commercial molasses syrup and 7.5 kilos of urea dissolved in 8 litres of water. When the whole is converted into a homogeneous paste, the mass is dried as described in Example 1.

What I claim is:—

1. A process for producing stable ester salts of leuco-vat-dyestuffs in dry state, applicable to ester salts, which are liable to decomposition, even in the presence of an excess of alkali, said process comprising intimately mixing the moist alkali salts of such esters containing an excess of alkali with an agglutinant and urea to form a paste and finally evaporating the paste to dryness.

2. A process for producing stable ester salts of leuco-vat-dyestuffs in dry state, applicable to ester salts, which are liable to decomposition, even in the presence of an excess of alkali, said process comprising intimately mixing the moist alkali salts of such esters containing an excess of alkali with an agglutinant and urea to form a paste, finally evaporating the paste to dryness and grinding the same.

3. A process for producing stable ester salts of leuco-vat-dyestuffs in dry state, applicable to ester salts, which are liable to decomposition, even in the presence of an excess of alkali, said process comprising intimately mixing the moist alkali salts of such esters containing an excess of alkali with molasses and urea to form a paste, finally evaporating the paste to dryness and grinding the same.

4. A process for producing stable ester salts of leuco-vat-dyestuffs in dry state, applicable to ester salts, which are liable to decomposition, even in the presence of an excess of alkali, said process comprising intimately mixing the moist alkali salt of the acid sulphuric acid ester of leuco-dimethoxy-dibenzanthrone containing an excess of alkali with an agglutinant and urea to form a paste, finally evaporating the paste to dryness and grinding the same.

5. A process for producing stable ester salts or leuco-vat-dyestuffs in dry state, applicable to ester salts, which are liable to decomposition, even in the presence of an excess of alkali, said process comprising intimately mixing the moist alkali salt of the acid sulphuric acid ester of leuco-dimethoxydibenzanthrone containing an excess of alkali with molasses and urea to form a paste, finally evaporating the paste to dryness and grinding the same.

ROGER RATTI.